UNITED STATES PATENT OFFICE.

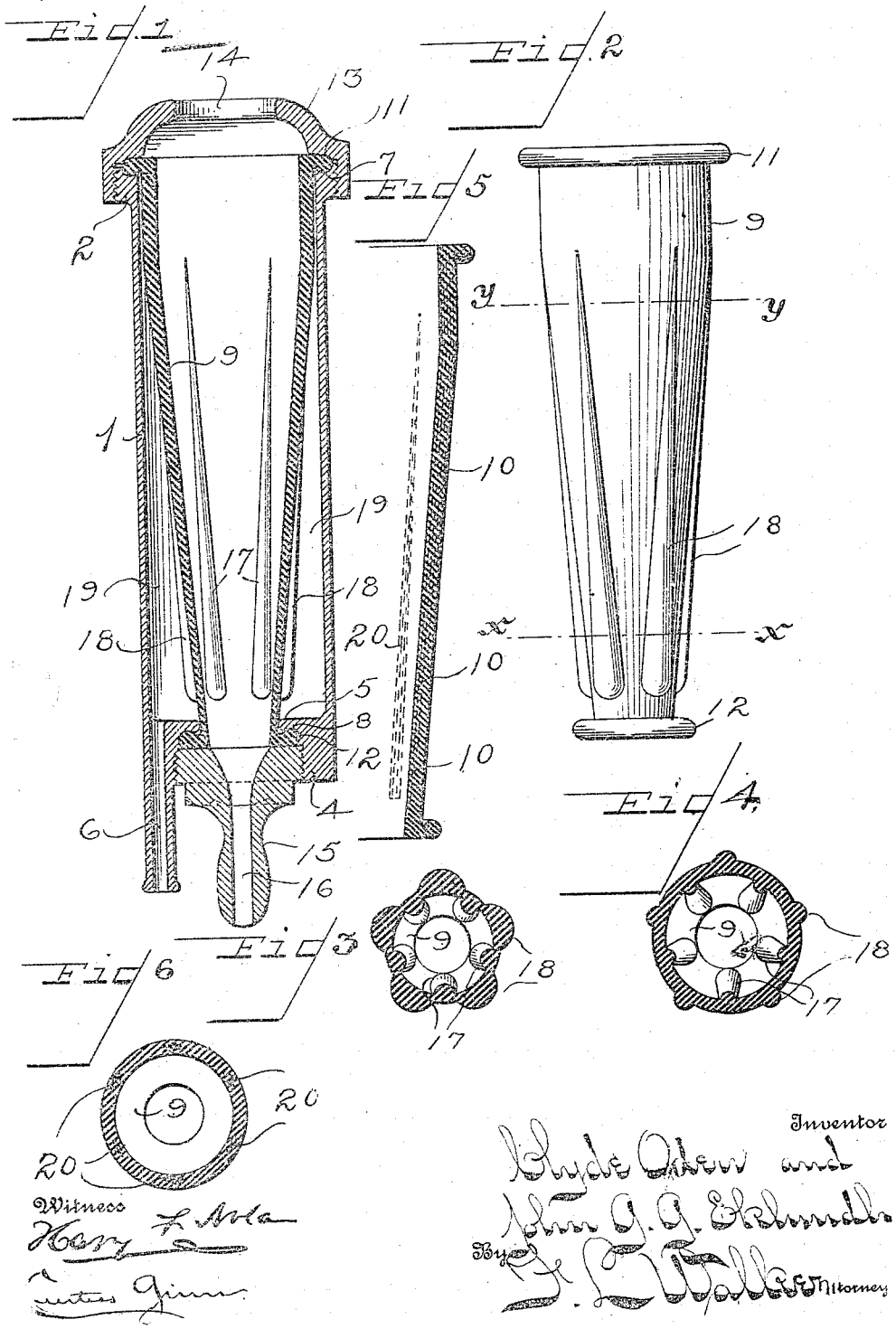

JOHN G. G. EKLUNDH AND CLYDE ODEN, OF COLUMBUS, OHIO, ASSIGNORS TO THE UNIVERSAL MILKING MACHINE COMPANY, A CORPORATION OF OHIO.

TEAT-CUP FOR MILKING APPARATUS.

1,285,079.

Specification of Letters Patent.

Patented Nov. 19, 1918.

Application filed September 5, 1916. Serial No. 118,393.

*To all whom it may concern:*

Be it known that we, JOHN G. G. EKLUNDH and CLYDE ODEN, a subject of the King of Sweden and a citizen of the United States, respectively, both residing at Columbus, in the county of Franklin and State of Ohio, have invented certain new and useful Improvements in Teat-Cups for Milking Apparatus, of which the following is a specification.

Our invention relates to milking apparatus and more particularly to teat cups therefor of the intermittently inflated or pulsating type.

The object of the invention is to simplify the structure as well as the means and mode of operation of such devices whereby they will not only be cheapened in construction, but will be more efficient in use, positive in operation, uniform in action, and unlikely to get out of repair.

A further object of the invention is to provide a teat cup which will be universal in its application to teats of varying length and diameter whereby the same cup may be used without change for different cows regardless of the relative size of the teats.

A further object of the invention is to provide a flexible lining or filler which will be uniform in its operation, contracting substantially uniformly throughout its periphery at all points throughout its length and adapted to contract initially and to a greater degree at its lower end, the contraction gradually extending upward with diminishing tension.

A further object of the invention is to provide a flexible lining or filler in which the tendency to wrinkle transversely will be obviated and the distortion under varying internal and external pressure is reduced to minimum.

A further object of the invention is to provide improved means for connecting the filler or lining within the housing.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a longitudinal sectional view of the assembled teat cup. Fig. 2 is a side elevation of the flexible lining or filler removed from the housing. Fig. 3 is a transverse sectional view looking downward on line *x—x* of Fig. 2. Fig. 4 is a transverse sectional view looking downward on line *y—y* of Fig. 2. Figs. 5 and 6 are respectively longitudinal and transverse sectional views of the filler illustrating modifications thereof.

Like parts are indicated by similar characters of reference throughout the several views.

The teat cup forming the subject matter hereof is of that type in which a vacuum or suction is constantly maintained upon the interior of the flexible lining or filler comprising the suction chamber and upon the teat contained therein while air is alternately admitted and exhausted from the housing about the exterior of said flexible lining or filler causing the lining to alternately contract and expand or vibrate. The compression of the teat by the contraction of the flexible lining or filler is not for the purpose of expelling a charge of milk as might be supposed, but is for the purpose of insuring blood circulation and preventing the congestion and overheating of the teat. To this end the flexibility of the lining or filler varies gradually throughout its length, being more flexible and easily contracted at its lower end, the flexibility and compression gradually decreasing upward. The pulsation or alternation of the expansion and contraction of the lining or filler, occurring in rapid succession, usually varying approximately from forty-eight to sixty times per minute, affords a massaging action upon the teat which tends to return upwardly to the udder the blood drawn into the teat at each suction stroke.

Referring to the drawings, the teat cup forming the subject matter hereof comprises a cylindrical housing 1 having about its upper edge an outwardly projecting externally threaded collar or flange 2 and at its lower end an internally threaded head 4 provided with an internal peripheral flange 5.

Leading to the interior of the housing 1 through the head 4 at one side of the central screw threaded opening thereof is an air conduit 6. This air conduit 6 is connected through a pulsator or other control means with a suitable suction device or vacuum pump. The pulsator or control means alternately opens the conduit 6 to atmosphere and closes it whereby the action of the vacuum pump is exerted therethrough to effect the pulsating action of the flexible lining or filler. The construction and operation of the pulsator and control mechanism is fully shown and described in copending application Serial No. 107,457 to which reference is made for a detailed description. It is to be understood, however, that the teat cup forming the subject matter hereof is not limited to use with the particular pulsator therein described but may be employed in conjunction with other pulsators or control means for alternately admitting and exhausting air through the conduit 6. The outer faces of the flanges 2 and 5 are preferably, though not necessarily, formed with concentric depressions or grooves 7 and 8.

The flexible lining or filler comprises an elongated tubular body of rubber, impervious fabric, composition, or other flexible yielding material, either reinforced or without reinforcement, according to the nature of the material and the conditions of use. This tubular body is of tapered or conical form, the walls of which also taper or gradually vary in thickness, being of least thickness and most flexible at the lower or smaller end of the body and heavier and more resistant at the upper or larger end thereof. This variation of thickness of the walls is best shown in Fig. 1. It will be obvious, however, that in lieu of varying the thickness of the walls to correspondingly vary the elasticity or flexibility of the member, the walls may be of equal thickness throughout and of varying composition of material or it may be reinforced to different degrees throughout its length, as indicated at 10 in Fig. 5, whereby different degrees of flexibility at different points throughout the length of the filler may be insured.

At both the upper and lower ends the filler body 9 is provided with external peripheral flanges 11 and 12 preferably, though not necessarily, convex on their inner or adjacent faces to agree with the annular grooves or depressions 7 and 8. The lining or filler 9 is preferably made of such length as to agree as nearly as convenient with the length of the housing 1 between the flanges 2 and 5 whereby the flexible lining or filler will be maintained in a state of neutral suspension, neither subjected to a stretching tension nor possessing an undue degree of slack or an excess of material. It will be understood that after long periods of use the filler or lining may accumulate some slack or play incident to the stretching of the material while in operation. However, as before stated, the ideal condition is one in which a filler will not be under tension or stretched and at the same time will be devoid of slack or looseness. In assembling the device the smaller end of the filler is introduced within the housing 1 and is passed through the central orifice in the flanged opening of the head 4. The insertion of the flange 12 through the opening is facilitated by the use of a special instrument inserted through said opening or by means of a string which may be engaged about the filler immediately above the flange by which the flange 12 may be drawn through the opening after which the string is disengaged. In the adjusted position of the filler 9 the flanges 11 and 12 engage upon the housing flanges 2 and 5. The upper end of the lining or filler is secured in position by a cap 13 screw threaded upon the housing flange 2 and having a central orifice 14 for the reception of the teat. This cap 13 bears upon the external flange 11 of the lining or filler and presses it within the annular groove or channel 7. At its lower end the filler is held in engagement with the housing by means of a nipple plug 15 screw-threaded into the orifice of the head 4 and bearing upon the internal flange 12 of the filler which is thereby compressed into engagement with the annular groove or channel 8 of the flange 5. The nipple 15 is provided with a passage or conduit 16 which communicates with the interior of the filler 9 or suction chamber. In practice, this nipple 15 is connected by a flexible conduit with the pail or milk receiver which is in turn connected with the suction device or vacuum pump. While the filler or lining may be of smooth interior or exterior or both and devoid of ribs or longitudinal reinforcing means, as hereinafter described, it is preferably provided with both internal and external tapered ribs or beads 17 and 18. These ribs or beads are largest at the lower or discharge end of the filler and gradually taper upward. Any number of these ribs or reinforcement beads may be provided. In the drawing but five have been shown. The purpose of the reinforcement ribs or beads is to insure the contraction of the lining or filler uniformly throughout its periphery. With the use of a plain lining or filler, it is found in practice that the filler contracts or collapses from three sides only in a triangular formation. By the use of a plurality of longitudinally disposed beads or reinforcement members, such as the ribs 17 and 18, the filler is caused to collapse more uniformly throughout the entire circumference inasmuch as the filler is made up of a plurality of alternate resistant and weak gores. These gores are tapered and oppositely disposed. The weak gores or those intermediate the beads tend to yield inwardly while the ribs maintain the general conical shape of the structure.

These longitudinally disposed ribs or reinforcing members perform the further function of preventing the bending or wrinkling of the lining or filler transversely, which might tend to rub or constrict the teat, causing a congestion of the blood therein and further tending to cause breakage of the filler walls. Upon the exhaustion of the air from the chamber 19 through the conduit 6 the longitudinally disposed ribs perform the further function of insuring the return or expansion of the flexible lower end of the filler to normal position. The construction is such that the walls intermediate the ribs being comparatively thin readily yield to the variation of the internal and external pressures, but in so yielding they place the longitudinal reinforcement ribs under such tension that said ribs will tend to return the flexible or collapsed walls upon the equalizing of the pressure. It is to be understood that either the inner ribs 17 or outer ribs 18, or both series of ribs, may be dispensed with if so desired. It will be obvious that in lieu of the exposed ribs or beads 17 and 18 the walls of the filler may be provided with reinforcement means longitudinally disposed therein and embedded or embodied in the wall's structure, as shown at 20 in Fig. 5.

It is obvious that by reversing the construction whereby the walls are at least resistant at the top and most resistant at the bottom whereby they will initially collapse at the top, the compression traveling progressively downward, an imitation of hand milking may be effected. Under such construction the compression of the filler would effect the discharge of milk.

From the above description it will be apparent that there is thus provided a device of the character described, possessing the particular features of advantage, before enumerated as desirable but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprises but one mode of putting the invention into effect, and the invention is therefore claimed broadly in any of its possible forms of modifications within the scope of the appended claims.

Having thus described our invention we claim:—

1. In a teat cup for milking apparatus, a main housing having a reduced opening at the lower end thereof, a flexible tubular filler therein of elongated conical form adapted at its lower end for engagement within the reduced opening of the housing, external peripheral integral flanges at opposite ends of filler, the flange at the lower end of said filler being adapted to be passed through the reduced opening of the housing and to engage with said main housing beyond the reduced opening thereof and adjustable clamping means at opposite ends of the housing for clamping the filler flanges in engagement therewith.

2. In a teat cup for milking apparatus, a housing, and a flexible tubular filler therein, the walls of said filler being of varying thickness whereby the response of said walls to variations of internal and external pressures will initially occur adjacent to the lower end of the filler and will progress upward.

3. In a teat cup for milking apparatus, a housing, a flexible tubular filler therein, the walls of said filler possessing less resistance adjacent to the lower end of the filler whereby the response of the walls to variations of internal and external pressures will initially occur adjacent to the lower end of the filler and will progress upward.

4. In a teat cup for milking apparatus, a housing, a flexible filler therefor, and a series of alternating internal and external longitudinal ribs formed on said wall whereby the response of the walls to variations of internal and external pressures will differ at various points throughout the circumference of said filler.

5. In a teat cup for milking apparatus, a housing, a flexible tubular filler therein, the walls of said filler being so constructed and arranged as to afford gradually varied resistance to variations of internal and external pressures whereby the contraction and expansion of the filler will initially occur adjacent to the lower end thereof and will act progressively upward throughout its length.

6. In a teat cup for milking apparatus, a flexible tubular filler therefor, the walls thereof being more resistant to variations of internal and external pressures in the upper portion than in the lower portion whereby the expansion and contraction of the filler will be more marked in its lower portion and will gradually diminish upwardly.

7. In a teat cup for milking apparatus, a housing, a flexible filler therein, longitudinally disposed reinforcement means arranged at spaced intervals throughout the peripheral extent of the tubular filler, the portions of the filler walls intermediate the reinforcement means being variably resistant longitudinally to variations of internal or external pressure whereby the filler will respond to variations of internal or external pressure more readily at separated points intermediate the reinforcement means and adjacent to one end of the filler, such response being made progressively toward the opposite end of the filler, substantially as specified.

8. In a teat cup for milking apparatus, a housing, a flexible tubular filler therein, and longitudinally disposed tapered beads upon the walls of said filler substantially as specified.

9. In a teat cup for milking apparatus, a housing, a flexible tubular filler therein, and longitudinal tapered beads upon the interior of said tubular filler substantially as specified.

10. In a teat cup for milking apparatus, a housing, a flexible tubular filler therein, and longitudinal tapered beads upon the exterior of said filler substantially as specified.

11. In a teat cup for milking apparatus, a housing, a flexible tubular filler therein, the walls of said filler comprising a plurality of alternating oppositely disposed tapered gores.

12. In a teat cup for milking apparatus, a housing, a flexible tubular filler therein, the walls of said filler comprising a plurality of alternating thick and thin tapered gores.

13. In a teat cup for milking apparatus, a housing, a flexible tubular filler therein, and longitudinally disposed tapered spaced reinforcing means for the walls of said filler.

14. In a teat cup for milking apparatus, a housing, a flexible tubular filler therein, said filler being least resistant adjacent to its lower end, the resistance thereof increasing progressively upward, said filler walls being reinforced at separated points throughout its periphery substantially as specified.

15. In a teat cup for milking apparatus, a housing, a flexible tubular filler therein the walls of which possess progressively varying resistance to contraction greatest at the upper extremity and least at the lower end and gradually varying reinforcement means the progressive resistance of which is inversely to that of the filler walls.

In testimony whereof, we have hereunto set our hands this 31 day of August, A. D. 1916.

JOHN G. G. EKLUNDH.
CLYDE ODEN.

Witnesses:
H. A. SIEGEL,
H. J. OSSING.